United States Patent Office 3,331,174
Patented July 18, 1967

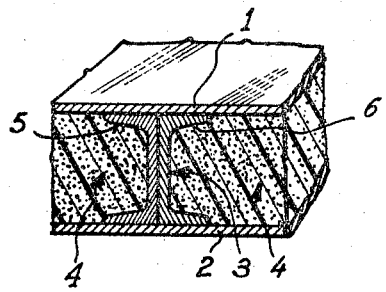
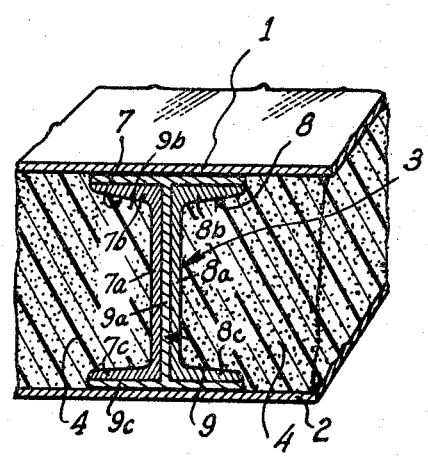
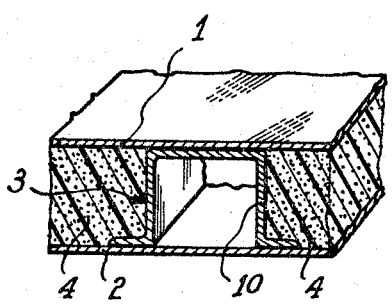
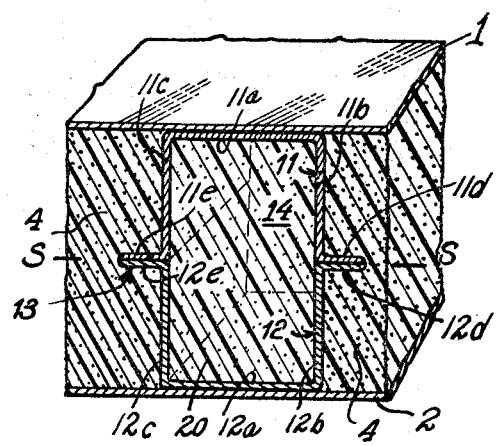

3,331,174
COMPOSITE PLATES OR PANELS
Ludwig Wesch, 18 Alter Weg Meierwik, Glucksburg (Ostsee), Germany, and Wilfried Stummer, Barcastrasse 1, Hamburg, Germany
Filed Dec. 17, 1964, Ser. No. 419,012
Claims priority, application Germany, Dec. 17, 1963, G 39,405
2 Claims. (Cl. 52—309)

The present invention relates to a composite plate or panel, particularly for use in ship-building. A co-pending German patent application, No. G 31,736, relates to a composite hatch cover with steel plates spaced apart by spacing members, with a foamed material of any desired kind completely filling the spaces between the spacing members and the steel plates. This arrangement makes it possible to reduce the sizes of the spacing members previously used in such composite constructions, whereby a considerable saying of weight as well as material is attainable. A layer of a stiff foam material which is secured to the whole of the surface of the plates and spacing members by adhesion to a great extent prevents the spacing members from buckling under heavy loads and therefore protects the cover plates against buckling or cracking in areas subjected to compression or tension.

We have now found that such composite constructions are advantageous not only for latch covers but quite generally as ship-building plates.

The invention has for an object the provision of a composite plate or panel, particularly for ship-building, which shall be light in weight and simple and economical to manufacture.

The invention consists in a composite plate or panel comprising at least two cover plates, spacing members for maintaining said cover plates in spaced-apart relationship, and a layer of a plastics material completely filling the unoccupied space between said cover plates, said spacing members having a profiled section and consisting of a plastics material reinforced by glass fibers.

Plates or panels according to the invention are particularly suitable for producing hatch covers or a ship's hull having a large surface, and in the latter case, the spacing members may advantageously serve as longitudinal frames or bulk heads, each according to the construction of the body of the ship.

A particular advantage of the construction in this as well as other uses, consists in that the plate or panel may be bent within certain limits, so that individual plates or panels may be adapted to any given use even in situ.

In a further German patent application No. G 34,897 is described a hatch cover constructed in the same general way as in the German application G 31,736, and wherein the cover plates are made from plastics material reinforced by glass fibers instead of steel.

According to an advantageous feature of the present invention, the cover plates thereof consist of plastics material reinforced by glass fibers.

In order that the invention may be more clearly understood, reference will now be made to the accompanying drawings which show sectional through some embodiments thereof by way of example, and in which:

FIGURE 1 shows a section through a composite plate formed from U-shaped spacing members, FIGURE 2 shows a section through a plate formed from U-shaped and I-shaped spacing members, FIGURE 3 shows a section through a plate from a single hat-shaped spacing member, and FIGURE 4 shows a section through a plate formed from two hat-shaped spacing members assembled into a box-shape.

Referring to the drawings, FIGURE 1 shows a section through a composite plate according to the invention with two cover plates 1 and 2 which may be made from glass-fiber reinforced plastics material. These cover plates are held in spaced-apart relationship by spacing members 3 of U-shape and the whole of whose surfaces next adjacent the cover plates are adhered thereto. The space 4 between any two spacing members 3 is filled with foamed material, which is adhered not only to the cover plates 1 and 2 but also to the outer surfaces of the spacing members. If desired, an additional protective layer of hard foamed material (which, however, has not been shown), may be provided between the cover plates and the foamed material filling the spaces 4.

According to the invention the spacing members 3 are profiled, and may be advantageously composed of a plurality of individual members which are adhered together. For example FIGURE 1 shows two U-shaped profiled spacing members 5 and 6, which are arranged mirror-image fashion and are adhered together web to web.

According to FIGURE 2, the spacing member 3 consists of the two U-shaped profiles 7 and 8 and an I-shaped profile 9. As shown, the I-shaped profiled portion 9 includes a web 9a and laterally extending flanges 9b and 9c. The outer surface of the flanges 9b and 9c are adhered respectively to the inner surface of the cover plates 1 and 2. The U-shaped profiles 7 and 8, which include respectively a web 7a and 8a and laterally extending flanges 7b, 7c and 8b, 8c, are inserted into the U-shaped openings formed by the flanges 9b and 9c on each side of the I-shaped profile 9 and the outer surface of the flanges 7b, 7c, 8b, 8c are adhered directly to the inner surface of the flanges 9b and 9c and the webs 7a and 8a are adhered directly to the web 9a.

Besides the simple profiled shapes, such as I-, T-, U-, Z-shapes, hat-shaped profiles 10, as shown in FIGURE 3, are also suitable.

The use of hollow shapes as spacing members is particularly advantageous. In the construction of a spacing member as shown in FIGURE 4, two hat-shaped profiled sections 11 and 12 are provided, which are arranged mirror-image fashion about the plane S—S of the neutral bending axis and are adhered together in this plane by their turned-over edges 13. As clearly shown in FIG. 4, the profiled section 11 includes a web portion 11a adhered to the cover plate 1, wall portions 11b and 11c disposed substantially normal to the web portion 11a and at either side thereof, and flange portions 11d and 11e disposed in a plane substantially parallel to the web portion 11a. The profiled section 12 is of the same configuration as profiled section 11 and includes a web portion 12a adhered to the cover plate 2, wall portions 12b and 12c and flange portions 12d and 12e which are adhered respectively to the flange portions 11d and 11e of the profiled section 11. The hollow space 14 within the box-shape thus formed, may also be advantageously filled with foamed material 20, which reinforces the parts of the member at right angles to the cover plates against buckling in association with the foamed material in the spaces 4.

A butadiene-styrol-polymer is particularly advantageous when reinforced by glass fibers as the material for the profiled spacing members, as well as for the cover plates if desired. The polymeric material preferably has a glass-fiber constituent of 50 to 80% for the spacing members and of 60 to 75% for the cover plates.

If desired, beads or pearls of hard foamed material may be additionally embedded in the layer of foamed material.

We claim:

1. A composite plate or panel comprising at least two cover plates having inner surfaces, spacing members maintaining said cover plates in spaced-apart relationship, said spacing members each comprising a pair of profiled sections consisting of a plastics material reinforced by glass fibers, each of said profiled sections comprising a web portion, a wall portion extending outwardly from each side of said web portion and substantially normal thereto, and a flange portion extending outwardly from the outer edge of each of said wall portions and disposed in a plane substantially parallel to said web portion, said flange portions of each of said pair of profiled sections being adhered together forming a generally box-shaped spacer member, the two web portions of each of said spacing members being adhered to inner opposed surfaces of said cover plates, foamed plastics material completely filling the space between said cover plates and adhered to the inner surface of said cover plates, and foamed plastics material completely filling said box-shaped spacer members and adhered to the inner surface thereof.

2. A composite plate or panel comprising at least two cover plates having inner surfaces, spacer members maintaining said cover plates in spaced-apart relationship, said spacing members each comprising a plurality of separate profiled sections consisting of a plastics material reinforced by glass fibers, each of said profiled sections comprising an I-shaped portion having a web and laterally extending flanges at the opposite side edges thereof, said laterally extending flanges of said I-shaped portion having outer surfaces adhered to the opposed, inner surfaces of said cover plates and having spaced-apart, opposed inner surfaces on each side of said web providing a U-shaped opening on each side of said I-shaped portion, and a U-shaped portion having a web and laterally extending flanges at the opposite side edges thereof disposed in each of said U-shaped openings of said I-shaped portion, the web of each of said U-shaped portions being adhered directly to the web of the respective I-shaped portion and the flanges of each of said U-shaped portions having outer surfaces adhered directly to the inner, opposed surfaces of the respective flanges of the corresponding I-shaped portion, and foamed plastics material completely filling the space between the inner surfaces of said cover plates and the space within said U-shaped portions and being adhered to the said cover plates and to said U-shaped portions.

References Cited

UNITED STATES PATENTS

| 2,858,580 | 11/1958 | Thompson et al. | 52—309 X |
| 2,874,941 | 2/1959 | Woolard et al. | 52—615 X |
| 2,962,323 | 11/1960 | McBride | 52—309 X |

FOREIGN PATENTS

| 616,577 | 3/1961 | Canada. |
| 1,316,325 | 12/1962 | France. |
| 558,166 | 12/1943 | Great Britain. |
| 683,542 | 12/1952 | Great Britain. |
| 890,513 | 2/1962 | Great Britain. |
| 169,885 | 12/1959 | Sweden. |

FRANK L. ABBOTT, *Primary Examiner.*

RICHARD W. COOKE, JR., *Examiner.*

A. C. PERHAM, *Assistant Examiner.*